July 17, 1962　　　J. D. W. GREGG　　　3,044,518
ROAD WHEEL ATTACHMENTS
Filed Feb. 17, 1960

Inventor
John Dudley Wells Gregg
By L.S. Saulsbury
Attorney

United States Patent Office 3,044,518
Patented July 17, 1962

3,044,518
ROAD WHEEL ATTACHMENTS
John Dudley Wells Gregg, "Tobarcooran," Carnmoney,
Belfast, Northern Ireland
Filed Feb. 17, 1960, Ser. No. 9,220
Claims priority, application Great Britain Feb. 19, 1959
5 Claims. (Cl. 152—89)

This invention relates to road wheels for vehicles.

It is an object of the invention to provide a road wheel which obviates or mitigates the shock experienced in a vehicle when the wheel strikes an obstruction.

It is a further object of the present invention to provide a road wheel for a vehicle comprising a connection in the wheel between its rim and its hub, said connection maintaining lateral rigidity in the wheel and permitting a resilient movement of the rim relative to the hub in the plane of the wheel so that shock on the rim may be absorbed substantially in the direction of the angle of shock by virtue of the rim moving in that direction relative to the hub.

A road wheel, according to the present invention, may be pneumatically tyred and be employed as one of the customary road wheels of a vehicle. Alternatively, however, a road wheel, according to the present invention, may be adapted for attachment to a punctured vehicle road wheel so as to dispense with the necessity of using jacks to remove the punctured road wheel and replace it with a spare road wheel.

Figure 1:
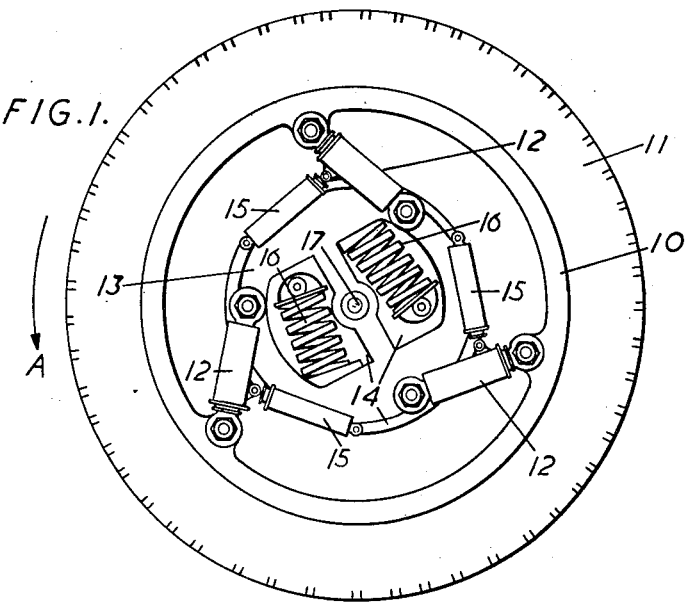
Figure 2:
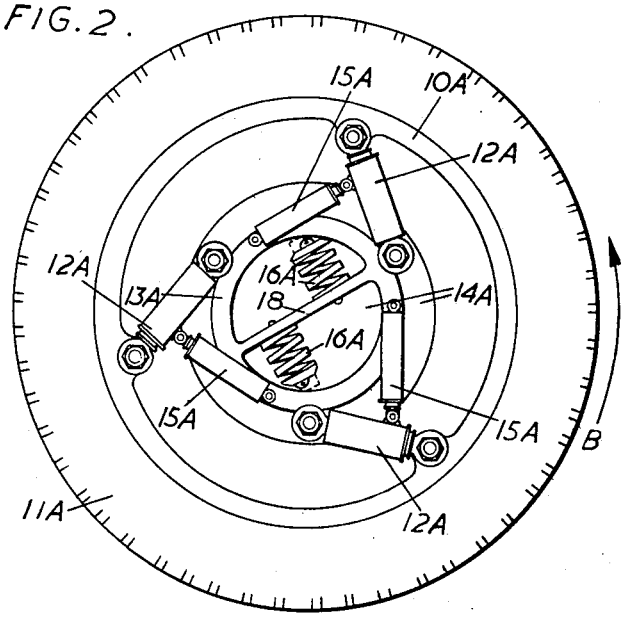

Examples of the present invention will now be described with reference to the accompanying drawings, in which:

FIG. 1 is a side elevation of a road wheel according to the present invention; and, FIG. 2 is a side elevation of a modified road wheel.

Referring now to FIG. 1, the road wheel comprises a rim 10 mounting a pneumatic tyre 11. The rim 10 is attached by four telescopic links 12 to a rotatable hub collar 13. Each link 12 is secured, at one end, to the rim 10 and, at the other end, to the hub collar 13. Each telescopic link 12 is connected to the vehicle brake drum 14 by a smaller telescopic link 15 which is connected, at one end, to the brake drum 14, and, at the other end, to the telescopic link 12 intermediate its ends. The rotatable hub collar 13 is connected to the brake drum 14 by a pair of side-by-side springs 16. The road wheel shaft is indicated at 17, and the direction of rotation of the road wheel is indicated by arrow A.

When the above described road wheel strikes an obstruction, the rim 10 moves relative to the hub collar 13 and brake drum 14 in the direction of the angle of shock so that the shock is absorbed before it can reach the hub portions 13 and 14 of the wheel due to the provision of the resilient connection between the rim and hub portions constituted by the telescopic links 12 and 15 and the springs 16. The blow or shock on the wheel is absorbed by the torque action thereof, such torque action being provided, in the present example, by permitting rotation of the rim 10 and tyre 11 against the telescopic arms 12 and 15 thrusting against the hub collar 13 and brake drum 14, the rotating movement of the hub collar 13 being controlled and damped by the springs 16.

The above described road wheel tends to drive itself over any obstruction it contacts.

The telescopic links 12 and 15 serve to give lateral rigidity to the wheel.

It is considered that the above described road wheel is especially suitable for use on racing cars, earth moving vehicles and agricultural vehicles, since with flying starts and rapid acceleration from cornering a certain amount of wind up is taken away by the road wheels from the engine when full power is suddenly applied thus obviating or mitigating wheelspin.

Referring now to FIG. 2, the modified road wheel is very similar to that described with reference to FIG. 1 of the drawings and like parts are referred to by the same reference numerals but with the suffix "A" appended. In this present example, the springs 16A instead of being disposed in side-by-side relationship are disposed one on either side of a division bar 18 in the hub collar 13A, the springs 16A each being attached to the division bar 18, at one end, and the brake drum 14A at the other end. Moreover, the telescopic links 12A are connected between the rim 10A and the brake drum 14A, while the telescopic links 15A are connected between the telescopic links 12A and the hub collar 13A. The direction of rotation of the road wheel is in the direction of arrow B.

The action of the modified road wheel on striking an obstruction is the same as that described with reference to FIG. 1.

It is considered that this modified road wheel is especially suitable for use on lightweight motor vehicles since it is felt that it gives a better deflection than the road wheel described with reference to FIG. 1.

The present invention may be applied to aircraft wheels but the torsion would probably require to be increased to assist braking on landing. This could be done in any suitable manner, for example by hydraulic dampening.

The probable advantages of employing wheels according to the present invention on aircraft would be as follows:

(1) The greatest wear on aircraft tyres is on landing, due to the wheel suddenly being jerked from rest to violent motion. The torsion wheel would cushion this by tending to spread this sudden loading.

(2) As with a motor vehicle, the torsion wheel would lighten the unsprung weight.

(3) The torsion wheels would also be of benefit on starting the take off run.

(4) Where an aircraft was operating from small, rough air strips the wheel would iron out the roughnesses and bumps as with a ground vehicle on rough terrain. This would have beneficial effects on the take off run and on landing.

(5) Modern heavy planes with multiple wheeled bogey undercarriages would be particularly benefited by a wheel which would augment the already efficient undercarriage.

(6) The torsion wheel would tend to decrease brake wear, on a heavy plane especially, as the brakes could be applied earlier. This would lessen the landing run, already a grave problem with larger modern jet aircraft.

(7) It should be possible to design a variable rate springing medium for use with an aircraft torsion wheel.

(8) The attitude of an aircraft on landing would no longer be as critical as at present.

(9) Spinning the wheels of a landing aeroplane does not stop them from scorching on a hard touch down. If the moment of shock can be reduced by torsion wheels the result would be a saving in rubber.

It is considered that road wheels according to the present invention are more efficient if they are driven as opposed to being freely rotatable.

The above described road wheel constructions means that the road wheels themselves now form part of the motor vehicle suspension and are not merely means of locomotion.

The rim of each road wheel construction is sprung by a torque or twisting action against spring means and other shock absorber devices, i.e. the telescopic links. The shock, on striking an obstruction, causes the rim to move in the direction of the blow and to absorb a considerable proportion of the shock before the main vehicle suspension is called into play.

It is considered that a motor vehicle embodying road wheels according to the present invention would not be prone to wheelspin thus decreasing tyre war.

It is also considered that road wheels according to the present invention would give increased traction when necessary.

It is to be carefully noted that the movement of the rim relative to the hub in each of the above described embodiments is constantly controlled by the various devices interconnecting the rim and the hub.

I claim:

1. A road wheel for a vehicle comprising a hub structure including a hub proper and a brake drum, a rim, and shock-absorbing means maintaining the lateral rigidity of the wheel and comprising a first series of angularly-spaced inclined telescopic links interconnecting the rim and hub proper, and a second series of angularly-spaced, inclined telescopic links, each interconnecting the brake drum and one of the first series of telescopic links intermediate its ends, the two series of telescopic links permitting the rim to move resiliently relative to the hub structure in the plane of the wheel so that shock on the rim is absorbed substantially in the direction of the angle of shock by virtue of the rim moving in that direction relative to the hub structure.

2. A road wheel for a vehicle comprising a hub structure including a hub proper, a brake drum, and movement-controlling and damping spring means connecting the hub proper and the brake drum, a rim, and shock-absorbing means maintaining the lateral rigidity of the wheel and comprising a first series of angularly-spaced, inclined telescopic links interconnecting the rim and hub proper, and a second series of angularly-spaced, inclined telescopic links, each interconnecting the brake drum and one of the first series of telescopic links intermediate its ends, the two series of telescopic links permitting the rim to move resiliently relative to the hub structure in the plane of the wheel so that shock on the rim is absorbed substantially in the direction of the angle of shock by virtue of the rim moving in that direction relative to the hub structure.

3. A road wheel for a vehicle comprising a hub structure including a hub proper and a brake drum, a rim, and shock-absorbing means maintaining the lateral rigidity of the wheel and comprising a first series of angularly-spaced, inclined telescopic links interconnecting the rim and the brake drum, and a second series of angularly-spaced, inclined telescopic links, each interconnecting the hub proper and one of the first series of telescopic links intermediate its ends, the two series of telescopic links permitting the rim to move resiliently relative to the hub structure in the plane of the wheel so that shock on the rim is absorbed substantially in the direction of the angle of shock by virtue of the rim moving in that direction relative to the hub structure.

4. A road wheel for a vehicle comprising a hub structure including a hub proper, a brake drum, and movement-controlling and damping spring means interconnecting the hub proper and the brake drum, a rim, and shock-absorbing means maintaining the lateral rigidity of the wheel and comprising a first series of angularly-spaced, inclined telescopic links interconnecting the rim and the brake drum, and a second series of angularly-spaced, inclined telescopic links, each interconnecting the hub proper and one of the first series of telescopic links intermediate its ends, the two series of telescopic links permitting the rim to move resiliently relative to the hub structure in the plane of the wheel so that shock on the rim is absorbed substantially in the direction of the angle of shock by virtue of the rim moving in that direction relative to the hub structure.

5. A road wheel for a vehicle comprising a hub structure including two components in the form of a hub proper and a brake drum, a rim, and shock-absorbing means maintaining the lateral rigidity of the wheel and comprising a first series of angularly-spaced inclined telescopic links interconnecting the rim and one of the hub structure components, and a second series of angularly-spaced inclined telescopic links, each interconnecting the other hub structure component and one of the first series of telescopic links intermediate its ends, the two series of telescopic links permitting the rim to move resiliently relative to the hub structure in the plane of the wheel so that shock on the rim is absorbed substantially in the direction of the angle of shock by virtue of the rim moving in that direction relative to the hub structure.

References Cited in the file of this patent
UNITED STATES PATENTS

| | | |
|---|---|---|
| 1,617,442 | Eaid | Feb. 15, 1927 |
| 1,650,609 | Cravens | Nov. 29, 1927 |
| 2,438,284 | Horn | Mar. 23, 1948 |
| 2,439,312 | McGlaun | Apr. 6, 1948 |
| 2,466,794 | Craig | Apr. 12, 1949 |
| 2,533,869 | Barfus | Dec. 12, 1950 |
| 2,697,467 | Giannotti | Dec. 21, 1954 |